(12) United States Patent
Sadler

(10) Patent No.: US 11,713,777 B2
(45) Date of Patent: Aug. 1, 2023

(54) AIRCRAFT POWER SYSTEM

(71) Applicant: AIRBUS OPERATIONS LIMITED, Bristol (GB)

(72) Inventor: Andrew David Sadler, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/515,319

(22) Filed: Oct. 29, 2021

(65) Prior Publication Data

US 2022/0170487 A1    Jun. 2, 2022

(30) Foreign Application Priority Data

Nov. 27, 2020 (GB) ...................................... 2018731

(51) Int. Cl.
| | |
|---|---|
| *F15B 15/18* | (2006.01) |
| *B64C 25/22* | (2006.01) |
| *B64C 25/24* | (2006.01) |
| *F15B 13/044* | (2006.01) |

(52) U.S. Cl.
CPC .............. *F15B 15/18* (2013.01); *B64C 25/22* (2013.01); *B64C 25/24* (2013.01); *F15B 13/0444* (2013.01); *F15B 2211/20515* (2013.01)

(58) Field of Classification Search
CPC ..... B64C 25/24; B64C 25/22; F15B 13/0444; F15B 15/18
See application file for complete search history.

(56) References Cited

U.S. PATENT DOCUMENTS

| | | |
|---|---|---|
| 9,650,130 B2 | 5/2017 | Bouzmane |
| 10,093,288 B2 | 10/2018 | Jiao et al. |
| 2004/0075020 A1 | 4/2004 | Trikha |
| 2009/0076668 A1 | 3/2009 | Lynas et al. |
| 2011/0062282 A1 | 3/2011 | Richter et al. |
| 2015/0266567 A1 | 9/2015 | Bouzmane |
| 2018/0237130 A1 | 8/2018 | Calder et al. |

FOREIGN PATENT DOCUMENTS

| | | |
|---|---|---|
| CN | 106741887 | 5/2017 |
| CN | 108750125 | 11/2018 |
| EP | 3 653 494 | 5/2020 |

OTHER PUBLICATIONS

Combined Search and Examination Report for GB2018731.6, dated Aug. 23, 2021, 11 pages.

*Primary Examiner* — Abiy Teka
*Assistant Examiner* — Daniel S Collins
(74) *Attorney, Agent, or Firm* — Nixon & Vanderhye P.C.

(57) ABSTRACT

Aircraft power system is disclosed having a hydraulic reservoir, a bi-directional hydraulic pump for pumping hydraulic fluid to and from the reservoir, and an electric motor. The electric motor is connectable to a first driveable component of the aircraft such that the electric motor is arranged to drive the first driveable component of the aircraft. The hydraulic pump is connectable to the first driveable component of the aircraft such that the hydraulic pump is arranged to pump hydraulic fluid from the reservoir to drive the first driveable component of an aircraft. Thus, in a first driveable mode of operation, the first driveable component is driven by both the electric motor and the hydraulic pump.

20 Claims, 5 Drawing Sheets

AIRCRAFT POWER SYSTEM

CROSS RELATED APPLICATION

This application claims priority to United Kingdom Patent Application GB 2018731.6, filed Nov. 27, 2020, the entire contents of which is hereby incorporated by reference.

BACKGROUND OF THE INVENTION

The present invention concerns aircraft power systems. More particularly, but not exclusively, this invention concerns a hybrid aircraft power system for driving a driveable component. The invention also concerns a method of operating an aircraft having such an aircraft power system.

Typically, an aircraft taxis to and from a runway using thrust from its engines. In an effort to reduce fuel usage, there has been an effort to develop alternative means to enable aircraft taxiing. It is well known in the prior art to use an aircraft power system to drive a driveable component of an aircraft (for example, landing gear extension/retraction mechanisms, high lift device mechanisms, or landing gear brakes). Such driveable components are typically hydraulically actuated, with the aircraft power system providing hydraulic power to actuate the driveable component.

It has been proposed to use a hydraulic aircraft power system to drive the wheels of an aircraft to enable the aircraft to taxi. For example, Chinese patent no. CN106741877 describes a hydraulic aircraft power system for driving the wheels of the aircraft to enable taxiing. The hydraulic aircraft power system includes a hydraulic fluid reservoir, which provides a store of hydraulic power. The aircraft wheels are each connected to a hydraulic motor, which is connected to the hydraulic reservoir such that the hydraulic aircraft power system can be used to drive the hydraulic motor (and thereby the wheels) to enable taxiing. As hydraulic fluid from the reservoir is used to drive the hydraulic motors, the reservoir is depleted. The hydraulic aircraft power system therefore also includes an electric motor connected to a hydraulic pump. Using electrical power from an aircraft electrical power system, the electric motor drives the hydraulic pump to pump hydraulic fluid back into the reservoir. Thus, the electric motor and hydraulic pump operate to convert electrical power into hydraulic power. In addition, the hydraulic motors are configured to also operate as hydraulic pumps. Thus, when the aircraft is braking, the hydraulic motors use the kinetic energy of rotation of the wheels to pump hydraulic fluid into the reservoir. Thus, the hydraulic motor also operates to recover kinetic energy to recharge the hydraulic reservoir.

In recent years, it has also been proposed to enable taxiing by driving the wheels of the aircraft using an electric motor and an electric aircraft power system (so-called "e-taxi" systems). However, whilst electric motors are well-suited to maintaining the wheels at a constant rotation speed (for example, when an aircraft is already in motion), they are less suited to initiating a change in rotation speed (for example, when a stationary aircraft begins taxiing) or when going up a slope. Thus, the electric motor must be oversized in order to enable electric taxiing across the full range of expected wheel rotation drive requirements, increasing the weight and power consumption of the electric motor.

The present invention seeks to mitigate one or more of the above-mentioned problems. Alternatively or additionally, the present invention seeks to provide an improved aircraft power system.

SUMMARY OF THE INVENTION

The present invention provides, according to a first aspect, an aircraft power system comprising: a hydraulic reservoir, a bi-directional hydraulic pump for pumping hydraulic fluid to and from the reservoir, and an electric motor. The electric motor is connectable to a first driveable component of the aircraft such that the electric motor is arranged to drive the first driveable component of the aircraft. The hydraulic pump is connectable to the first driveable component of the aircraft such that the hydraulic pump is arranged to drive the first driveable component. In a first driveable mode of operation, the first driveable component is driven by both the electric motor and the hydraulic pump.

Such a system allows for both hydraulic and electric power to be utilised to drive a driveable component of the aircraft. Thus, the driveable component can be driven by both the hydraulic pump and the electric motor at the same time. This enables the electric motor to be designed for a "steady state" or normal power requirement of the driveable component, because the hydraulic pump can provide an additional power requirement to the driveable component on a temporary/short-duration basis, when needed (e.g. to provide a peak power demand of 90 kW). This means that it is possible, in embodiments, for the electrical motor to be optimised for its most usual power output. The electric motor may also be designed for much lower required levels and so means that the system is much smaller than would otherwise be required. In embodiments, this enables maintenance, weight and cost savings, as well as a reduction in emissions and fuel burn.

The hydraulic fluid reservoir may comprise a hydraulic fluid accumulator. Thus, the hydraulic fluid reservoir may be arranged to hold hydraulic fluid under pressure. Thus, the system allows hydraulic energy to be stored in the reservoir, for example in a replenishing mode of operation. In such a mode of operation, the hydraulic pump may operate to store hydraulic power in the reservoir. This provides a means of storing surplus power as hydraulic power for later use to drive the driveable component (for example, in circumstances where excess power is temporarily required by the driveable component of the aircraft). Hence, such a system is able to store surplus energy for later use.

It may be that the electric motor and hydraulic pump are connected to each other in parallel. Thus, in the first driveable mode of operation, the electric motor and hydraulic pump may each be capable of supplying, and arranged to supply, power to the driveable component independently of the other. This ensures that, if one of the electric motor and hydraulic pump should fail, power is still provided to the driveable component by the other. It also means that each can be efficiently designed for their respective power outputs, rather than for the combined power output. Thus, the aircraft power system may be configured to operate in a first driveable mode of operation. Operating the aircraft power system in the first driveable mode of operation may comprise connecting the electric pump and the hydraulic pump to the first driveable component (for example, by use of the transfer unit). It may be that the hydraulic pump is configured to operate (for example, in the first driveable mode of operation) as a hydraulic motor under the action of hydraulic fluid flowing from the hydraulic fluid reservoir.

It may be that the electric motor and hydraulic pump are connected to a transfer unit. The transfer unit may be connectable to the driveable component. Thus, it may be that the transfer unit connects the electric motor to the hydraulic pump. It will be appreciated that such a connection enables the transfer of mechanical power. The transfer unit may be configured to connect and disconnect the hydraulic pump from at least one (for example, both) of the electric motor and the first driveable component. The transfer unit may be configured to connect and disconnect the electric motor from at least one (for example, both) of the hydraulic pump and the first driveable component. Thus, the transfer unit may be configured to enable each of the hydraulic pump, the electric motor, and the first driveable component to be independently connected and disconnected from the other two of the hydraulic pump, the electric motor, and the first driveable component.

The electric motor may be connected to the hydraulic pump such that, during a replenishing mode of operation, the electric motor is arranged to drive the hydraulic pump to pump hydraulic fluid into the reservoir. Thus, in the replenishing mode or operation, electrical energy (for example, from a battery) is used to pump hydraulic fluid to the hydraulic reservoir. The same electric motor can be used to store hydraulic power by driving the hydraulic pump to pump hydraulic fluid to the hydraulic reservoir in the regenerating mode of operation. This may be through the transfer unit, if present. In certain embodiments, the electric motor and the hydraulic pump may be connected to one another directly. Thus, the aircraft power system may be configured to operate in a replenishing mode of operation. Operating the aircraft power system in the replenishing mode of operation may comprise connecting the electric motor to the hydraulic pump (for example, by use of the transfer unit). Operating the aircraft power system in the replenishing mode of operation may comprise disconnecting the electric motor and the hydraulic pump from the first driveable component (for example, by use of the transfer unit).

Alternatively, or additionally, the hydraulic pump is electrically connectable to a second electric motor such that the second electric motor is arranged to drive the hydraulic pump to pump hydraulic fluid into the reservoir. The different electric motor may be provided with electrical power from the aircraft APU, a hydrogen fuel cell, a battery, or the aircraft engines.

The electric motor may also function as a generator. In such a case, it may be that, in a regenerating mode of operation, one or both of the electric motor and the hydraulic pump is externally driven by a moveable component of the aircraft (for example, the first driveable component) to store the kinetic energy from the moveable component generate electricity. Hence, in the replenishing mode, the electricity generated is used to pump hydraulic fluid to the hydraulic reservoir. The moveable component may be the first driveable component. Thus, the aircraft power system may be configured to operate in a regenerating mode of operation. Operating the aircraft power system in the regenerating mode of operation may comprise connecting at least one (for example, both) of the electric motor and the hydraulic pump to the first driveable component (for example, by use of the transfer unit). Operating the aircraft power system in the regenerating mode of operation may comprise disconnecting the electric motor and the hydraulic pump from the first driveable component (for example, by use of the transfer unit).

It may be that operating in the regenerating mode of operation comprises prioritising energy recovery by the hydraulic pump over energy recovery by the electric motor. Thus, it may be that energy recovered by operating in the regenerating mode is preferentially stored as hydraulic energy (for example, stored in the hydraulic fluid reservoir), rather than electrical energy (for example, stored in the battery). It may be that more than 50%, preferably more than 60%, more preferably more than 70%, yet more preferably more than 80% of the recovered energy is stored as hydraulic energy. Energy recovery using the hydraulic pump will be henceforth referred to as hydraulic energy recovery. Energy recovery using the electric motor will be henceforth referred to as electrical energy recovery.

Prioritising energy recovery by the hydraulic pump over energy recovery by the electric motor can enable recovery of a greater percentage of the kinetic energy of the first driveable component. The effectiveness of electrical energy recovering using the electric motor is limited by the characteristics of the electric motor. For example, energy recovery using the electric motor requires a minimum commutation speed of the electric motor shaft. Furthermore, energy recovery using the electric motor is also constrained by the size and power rating of the electric motor. By contrast, it is possible for energy recovery using the hydraulic pump to be effective at all rotor speeds. Therefore, in embodiments, prioritising hydraulic energy recovery over electrical energy recovery enables a more efficient and complete recovery of kinetic energy from the first driveable component.

The aircraft power system may further comprise a hydraulic sensor (for example, a pressure sensor) configured to determine a state of charge of the hydraulic fluid reservoir. The hydraulic sensor may be configured to generate hydraulic sensor data indicating the determined state of charge of the hydraulic fluid reservoir. The aircraft power system may further comprise a battery sensor configured to determine a state of charge of the battery. The battery sensor may be configured to generate battery sensor data indicating the determined state of charge of the battery. The aircraft power system may be configured to operate on the basis of one or both of the hydraulic sensor data and the battery sensor data. Such data may, at least in part, be provided as digital data. Such data may, at least in part, be provided as analogue signals.

The aircraft power system may be configured to prioritise energy recovery by one of the hydraulic pump and the electric motor (for example, on the basis of one or both of the hydraulic sensor data and the battery sensor data). The aircraft power system may be configured to preferentially recover energy via the hydraulic pump (for example, unless or until the hydraulic sensor data indicates that the determined state of charge of the hydraulic fluid reservoir exceeds a predetermined threshold). The aircraft power system may be configured to preferentially recover energy via the hydraulic pump by recovering energy using only the hydraulic pump. The aircraft power system may be configured to recovery energy only via the hydraulic pump until the state of charge of the hydraulic fluid reservoir exceeds a predetermined threshold. It may be that, once the state of charge of the hydraulic fluid reservoir exceeds the predetermined threshold, the aircraft power system ceases to recover energy using the hydraulic pump. The aircraft power system may subsequently recover energy using the electric motor. Thus, the prioritisation of hydraulic energy recovery may be performed by exclusively recovering energy via the hydraulic pump for a first period of time before exclusively recovering energy via the electric motor for a second period of time. It will be appreciated that the first and second periods of time may be defined in terms of a quantity of energy recovered, rather than as fixed time periods.

It may be that the aircraft power system is configured in certain embodiments to simultaneously recover energy electrically and hydraulically whilst prioritising hydraulic energy recovery. In such cases, it may be that the transfer box is configured to perform torque splitting to direct the kinetic energy from the first driveable component to the hydraulic pump and the electric motor according to a predetermined torque splitting ratio. For example, the transfer box may be configured to perform torque splitting such that 70% the kinetic energy of the first driveable component is directed to the hydraulic pump (i.e. a torque splitting ratio between the hydraulic pump and the electric motor of 7:3). It will be appreciated by the skilled person that other torque split ratios are also equally possible. The torque splitting ratio may be in the range of 95:5 to 55:45, for example, in favour of prioritising hydraulic energy recovery—for at least some of the time. It may be that the aircraft power system is configured to adjust the torque splitting ratio (for example, on the basis of the hydraulic sensor data and the battery sensor data). The aircraft power system may be configured to alter the torque splitting ratio on the basis of one or both of the hydraulic sensor data and the battery sensor data. For example, the aircraft power system may be configured to alter the torque splitting ratio in response to the hydraulic sensor data indicating that the hydraulic fluid reservoir has reached a predetermined state of charge. In such a case, it may be that the predetermined state of charge is fully charged, and the alteration to the torque splitting ratio is such that the aircraft power system ceases to recover energy via the hydraulic pump.

The aircraft power system may comprise a processor and associated memory. The processor may be configured to (for example, by execution of instructions stored in the associated memory) control operation of the aircraft power system (including, for example, operation of the hydraulic sensor and the battery sensor).

The hydraulic pump may also be connectable to other driveable components of the aircraft. Hence, in a second driveable mode of operation, the hydraulic pump can provide hydraulic power to one or more other driveable components. These other driveable components may include: landing gear extension/retraction mechanisms, landing gear bay door mechanisms, cargo door mechanisms, landing gear braking, high lift device mechanisms (for example, flaps and/or slats), flight control surfaces or a hybrid propulsion system.

The electric motor may be connected to the hydraulic pump such that the electric motor is arranged to drive the hydraulic pump to pump hydraulic fluid out of the reservoir. Hence, in the second driveable mode of operation, the electric motor may drive the hydraulic pump to provide hydraulic power to the other driveable components. It may be that this occurs and for example is configured to so occur, when the first driveable component does not need to be driven by the electric motor.

The first driveable component may comprise one or more landing gear wheels. Hence, in the first driveable mode of operation the electric motor (and hydraulic pump) drives the landing gear wheels to move the aircraft over the ground (this is known as e-taxiing). Here, the electric motor can be optimised for driving the landing gear wheels at a constant velocity over level ground, for example. In such embodiments, if there is an uphill slope, or when the landing gear wheels are to accelerate (for example, when starting to e-taxi the aircraft), it may then be the case that the hydraulic pump is used to provide additional power.

In a regenerating mode of operation (in the case where there are one or more driven landing gear wheels) it may be that the electric motor is externally driven by the landing gear wheel(s), for example after aircraft landing (e-taxi retardation) when the wheels are turning with excess kinetic energy. In embodiments, this may help to reduce brake wear by slowing the aircraft by regenerative braking, as well as traditional carbon brakes. This may, as a result, reduce the cost of brake maintenance, as well as reduce the environmental impact of the brake manufacture required.

In certain embodiments, it may be that the first driveable component comprises an open rotor propeller or a drive shaft of a high or low pressure turbine.

According to a second aspect of the invention there is also provided an aircraft landing gear drive system comprising the aircraft power system as described above, wherein the first driveable component comprises one or more landing gear wheels of the landing gear drive system. The electric motor and the hydraulic pump are both connected to the one or more landing gear wheels, such that the electric motor and the hydraulic pump are both able to drive the one or more landing gear wheels.

According to a third aspect of the invention there is also provided an aircraft comprising the aircraft power system of the first aspect or the landing gear drive system of the second aspect. It may be that the aircraft is a passenger aircraft.

According to a fourth aspect of the invention there is also provided a method of operating an aircraft, the aircraft being as per the third aspect (or comprising the aircraft power system of the first aspect or the landing gear drive system of the second aspect). In a first driveable mode of operation, the first driveable component is driven by both the electric motor and the hydraulic pump.

It may be that, in a replenishing mode of operation, the electric motor drives the hydraulic pump to pump hydraulic fluid into the reservoir.

It may be that, in a second driveable mode of operation, the hydraulic pump provides hydraulic power to one or more other driveable components.

It may be that, in the second driveable mode of operation, the electric motor drives the hydraulic pump to provide hydraulic power to the other driveable components.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
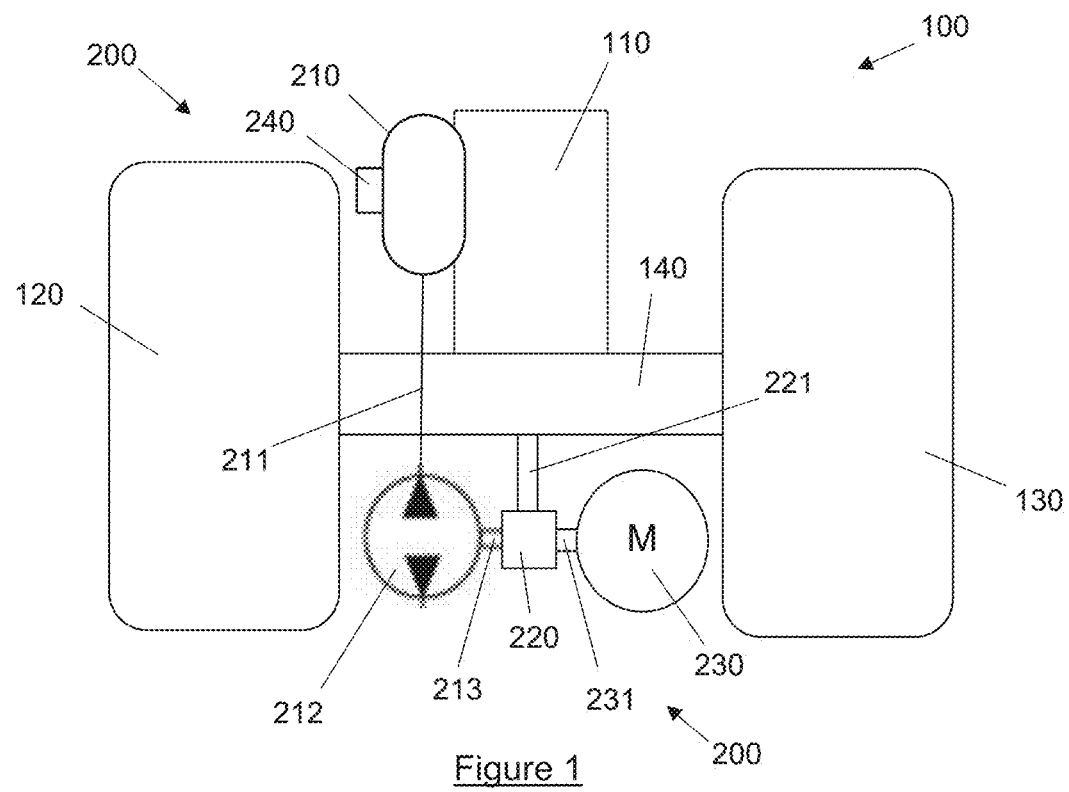
FIG. 1 shows a schematic view of an aircraft landing gear according to a first embodiment of the invention.

FIG. 1 shows a schematic view of an aircraft landing gear 100 according to a first embodiment of the invention. The landing gear 100 comprises a landing gear leg 110. An axle 140 is mounted on and extends outwards from the landing gear leg 110. A first landing gear wheel 120 is mounted for rotation on a first end of the axle 140. A second landing gear wheel 130 is mounted for rotation on an opposite second end of the axle 140. When the landing gear 100 is supporting the weight of an aircraft on the ground, the rotation of the first and second landing gear wheels 120, 130 facilitates movement of the aircraft across the ground.

The landing gear 100 further comprises a power system 200. The power system 200 comprises an electric motor 230. The electric motor 230 is connected to the landing gear wheels 120, 130 via a transfer box 220. A mechanical connection 231 connects the electric motor 230 to the transfer box 220. The transfer box 220 is connected to the axle 140 (and thereby to the wheels 120, 130) by a drive shaft 221. Mechanical connection 231, transfer box 220, drive shaft 221, and axle 140 together enable the transfer of kinetic energy from the electric motor 230 to the wheels 120, 130.

Thus, the electric motor 230 can drive the wheels 120, 130. The electric motor 230 is therefore capable of converting electrical energy (for example, from an aircraft auxiliary power unit (APU), a hydrogen fuel cell, a battery, or the aircraft engines) into kinetic energy in the form of rotation of the wheels 120, 130. The electric motor 230, mechanical connection 231, transfer box 220, drive shaft 221, and axle 140 can all therefore be considered to form part of a landing gear drive system.

The power system 200 further comprises a hydraulic fluid reservoir 210, configured to contain a store of hydraulic fluid. The hydraulic fluid reservoir 210 is connected to a bi-directional hydraulic pump 212 by a hydraulic line 211, such that the hydraulic line 211 provides fluid communication between the hydraulic fluid reservoir 210 and the hydraulic pump 212. Thus, the hydraulic pump 212 is operable to pump hydraulic fluid to and from the hydraulic fluid reservoir 210.

A mechanical connection 213 connects the hydraulic pump 212 to the transfer box 220. Thus, the hydraulic pump 212 is also connectable to the wheels 120, 130. Mechanical connection 213, transfer box 220, drive shaft 221, and axle 140 together enable the transfer of kinetic energy from the hydraulic pump 212 to the wheels 120, 130. The hydraulic fluid reservoir 210 comprises a high-pressure accumulator, such that hydraulic fluid stored in the hydraulic fluid reservoir 210 is held under pressure. Thus, the hydraulic fluid reservoir 210 acts as a store of hydraulic power (for example, for use in driving the first driveable component). The hydraulic fluid reservoir 210 also comprises a valve (not shown) which is operable to control the release of hydraulic fluid from the hydraulic fluid reservoir 210. When stored hydraulic fluid is released from the hydraulic fluid reservoir 210 (for example, by opening the valve), it is driven from the hydraulic fluid reservoir 210 by action of the pressure at which it is held. Thus, the hydraulic fluid reservoir 210 is operable to provide a pressurised stream of hydraulic fluid.

Pressurised hydraulic fluid released from the hydraulic fluid reservoir 210, can be used to drive one or more driveable components of the aircraft. In particular, the flow of pressurised hydraulic fluid from the hydraulic fluid reservoir 210 can be used to turn the hydraulic pump 212. The bi-directional hydraulic pump 212 thereby acts as a hydraulic motor, converting the hydraulic power from the flow of hydraulic fluid through the hydraulic pump 212 into kinetic energy, which is transferred by the connection 213, transfer box 220, drive shaft 221, and axle 140 to the wheels 120, 130. Thus, bi-directional hydraulic pump 212 and mechanical connection 213 can also be considered to form part of a landing gear drive system.

The transfer box 220 is operable to selectively connect and disconnect the mechanical connections 213, 231 and the drive shaft 221. In this case, the transfer box comprises a clutching mechanism (not shown) connected to each of the mechanical connections 213, 231 and the drive shaft 221. Thus, by operating the clutching mechanisms the mechanical connections 213, 231 and the drive shaft 221 can each be independently connected and disconnected. Thus, the transfer box 220 controls the transfer of energy between the electric motor 230, the hydraulic pump 212, and the wheels 120, 130. Thus, the electric motor and hydraulic pump can be said to be connected to each other in parallel such that both the electric motor and the hydraulic pump can each supply power to the wheels 120, 130 independently of the other. The power system 200 can therefore be said to be a hybrid power system (in that the system utilises both hydraulic and electrical power). The transfer box 220 is also operable to connect the electric motor 230 to the bi-directional pump, such that the electric motor 230 can be used to drive the bi-directional pump (for example, to pump hydraulic fluid to or from the hydraulic fluid reservoir 210).

The hydraulic pump 212 is also connectable to one or more further driveable components (not shown) of the aircraft. By pumping hydraulic fluid to and from the wheels 120, 130, it is possible to operate the wheels 120, 130. Similarly, the hydraulic pump 212 is operable to pump hydraulic fluid from the reservoir to drive the one or more further driveable components. Examples of such driveable components include landing gear extension/retraction mechanisms, landing gear bay door mechanisms, cargo door mechanisms, landing gear braking, high lift device mechanisms (for example, flaps and/or slats), and flight control surfaces.

The power system 200 comprises a hydraulic sensor 240. The hydraulic sensor is configured to determine a state of charge of the hydraulic fluid reservoir 210 and to generate hydraulic sensor data indicating the determined state of charge of the hydraulic fluid reservoir 210. The power system 200 also comprises a battery sensor (not shown). The battery sensor is configured to determine a state of charge of the battery and to generate battery sensor data indicating the determined state of charge of the battery. The power system 200 further comprises a processor (not shown) and associated memory (not shown). The processor is configured to execute instructions stored in the associated memory to control operation of the power system 200 (including, for example, operation of the hydraulic sensor 240 and the battery sensor).

The power system 200 is capable of operating in three distinct modes of operation: a driving mode, a regenerative mode, and a replenishing mode.

Figure 2:
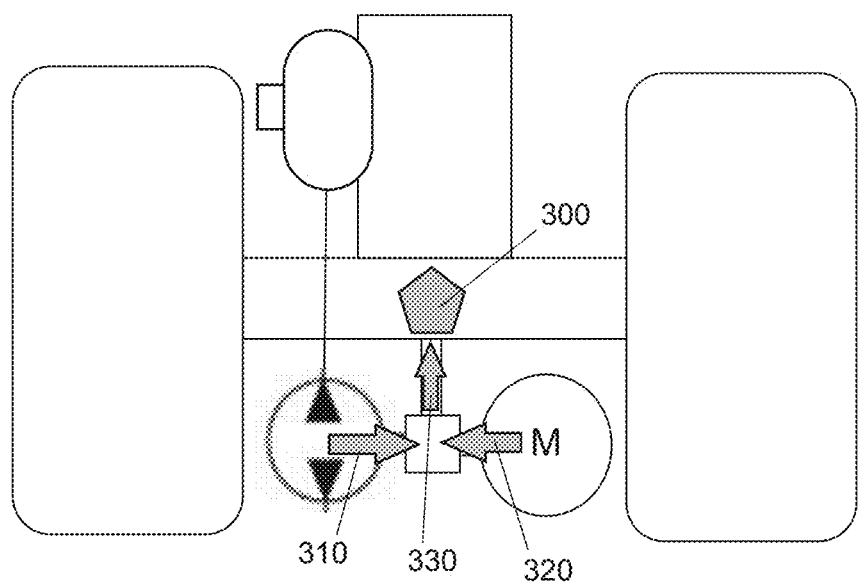
FIG. 2 shows a schematic view of the aircraft landing gear of FIG. 1 in a driving mode of operation.

FIG. 2 shows the power system 200 operating in the driving mode of operation. In the driving mode of operation, the wheels 120, 130 are driven by one or both of the electric motor 230 and the hydraulic pump 212. Thus, in the driving mode, one or both the electric motor 230 and the hydraulic pump 212 are connected to the wheels 120, 130 by the transfer box 220. When the electric motor 230 is connected to the wheels 120, 130 and the hydraulic pump 212 is disconnected from the wheels 120, 130, the electric motor 230 delivers electric drive power 320 to the transfer box 220, which delivers the electric drive power to the drive shaft 221 to turn the wheels. When the electric motor 230 is disconnected from the wheels 120, 130 and the hydraulic pump 212 is connected to the wheels 120, 130, the hydraulic pump 212 delivers el hydraulic drive power 310 to the transfer box 220, which delivers the hydraulic drive power to the drive shaft 221 to turn the wheels. When both the electric motor 230 and the hydraulic pump 212 are connected to the wheels 120, 130, the electric motor delivers electric drive power 320 to the transfer box 220 and the bi-directional hydraulic pump 212 delivers hydraulic drive power 310 to the transfer box 220. The transfer box 220 delivers the combined drive power 330 to the drive shaft 221 to turn the wheels 120, 130, enabling the aircraft to taxi (represented by item 300).

The ratio of power delivered to the wheels 120, 130 from the electric motor 230 to that from the hydraulic pump 212 varies depending on a current demand on the landing gear drive system. For example, when the aircraft is already in motion and the landing gear drive system is required only to maintain the current speed, the driving power delivered to the wheels 120, 130 may be primarily (for example, entirely) provided by the electric motor 230. When a higher demand is placed of the landing gear drive system (for example, when the aircraft is stationary and the landing gear drive system is required to accelerate the aircraft) the power from the electric motor 230 may be supplemented by additional power provided by the hydraulic pump 212. Thus, in this situation, the wheels are driven by both the electric motor and the hydraulic pump 212 together. The hydraulic pump 212 can therefore be used to provide additional power at times of high demand. Enabling the hydraulic pump 212 to supplement the electric motor 230 in this way means that the electric motor 230 can be optimised for operation at a constant speed, removing the need to oversize the electric motor 230 in order to enable it to meet the increased demands of accelerating the aircraft. This provides a reduction in the weight of the aircraft and thereby a reduction in emissions and fuel consumption.

Figure 3:
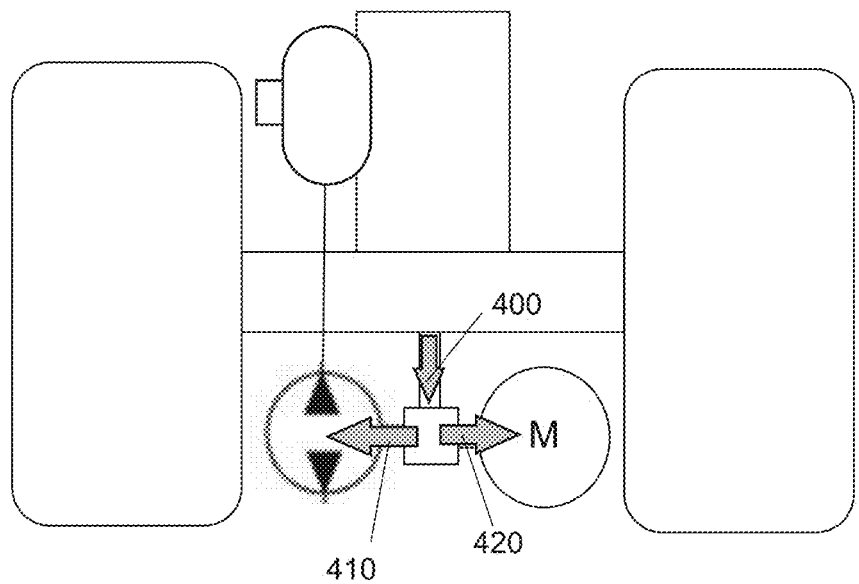
FIG. 3 shows a schematic view of the aircraft landing gear of FIG. 1 in a regenerative mode of operation.

FIG. 3 shows the power system 200 operating in the regenerative mode of operation. In the regenerative mode of operation, the power system 200 operates to recover kinetic energy from the wheels 120, 130. The energy recovery can be performed when the electric motor is externally driven by the wheels 120, 130 (for example, when the aircraft is braking). In the regenerative mode, the wheels 120, 130 are connected by the transfer box 220 to one or both of the electric motor 230 and the hydraulic pump 212. Which of the electric motor 230 and the hydraulic pump 212 the wheels 120, 130 are connected to is determined by the desired means for storing the recovered energy. The transfer box 220 can operate to connect the electric motor 230 to the wheels 120, 130 and disconnect the hydraulic pump 212 from the electric motor 230 and the wheels 120, 130. Alternatively, the transfer box 220 can operate to connect the hydraulic pump 212 to the wheels 120, 130 and disconnect the electric motor 230 from the hydraulic pump 212 and the wheels 120, 130. The transfer box 220 can also operate to connect the electric motor 230 and the hydraulic pump 212 to the wheels 120, 130.

When in the regenerative mode of operation, the kinetic energy 400 of the rotation of the wheels 120, 130 is transferred to the transfer box 220. The transfer box 220 then transfers the kinetic energy to one or both of the electric motor 230 and the hydraulic pump 212. When the wheels 120, 130 are connected to the electric motor 230, the kinetic energy of the wheels is transferred (represented by arrow 420) to the rotor of the electric motor 230. The electric motor 230 operates as a generator to convert the kinetic energy into electrical energy. This electrical energy can be stored (for example, in a battery) for later use, either by the electric motor 230 or by another aircraft subsystem. When the wheels 120, 130 are connected to the hydraulic pump 212, the kinetic energy of the wheels is transferred (represented by arrow 410) to the hydraulic pump 212. The hydraulic pump 212 is driven, using the kinetic energy, to pump hydraulic fluid into the hydraulic fluid reservoir 210. The kinetic energy is thereby stored as hydraulic energy in the hydraulic fluid reservoir 210 for later use, either to drive the wheels 120, 130 or another driveable component of the aircraft. It will be appreciated that the wheels 120, 130 can be connected to both the electric motor 230 and the hydraulic pump 212 at the same time, allowing recovered kinetic energy to be stored both electrically and hydraulically simultaneously. At other times, only one of the electric motor 230 and the hydraulic pump 212 is connected to the wheels 120, 130.

Thus, the power system 200 enables the recovery and storage (electrically and/or hydraulically) of kinetic energy from the wheels 120, 130. Further, performing regenerative braking in such a way reduces the braking forces that must be applied by the actual brakes, and therefore reduces the wear on those brakes.

In this particular embodiment, the power system 200 is configured to prioritise energy recovery via the hydraulic pump 212 over energy recovery via the electric motor 230. In this example embodiment, the power system 200 is configured to prioritise energy recovery via the hydraulic pump 212 by performing energy recovery using only the hydraulic pump 212 (i.e. not using electric motor 230) until such time as hydraulic sensor data from hydraulic sensor 240 indicates that the hydraulic reservoir is fully charged. However, it will be appreciated that other schemes for managing energy recovery in the regenerating mode of operation (for example, as described above) are equally usable.

Figure 4:
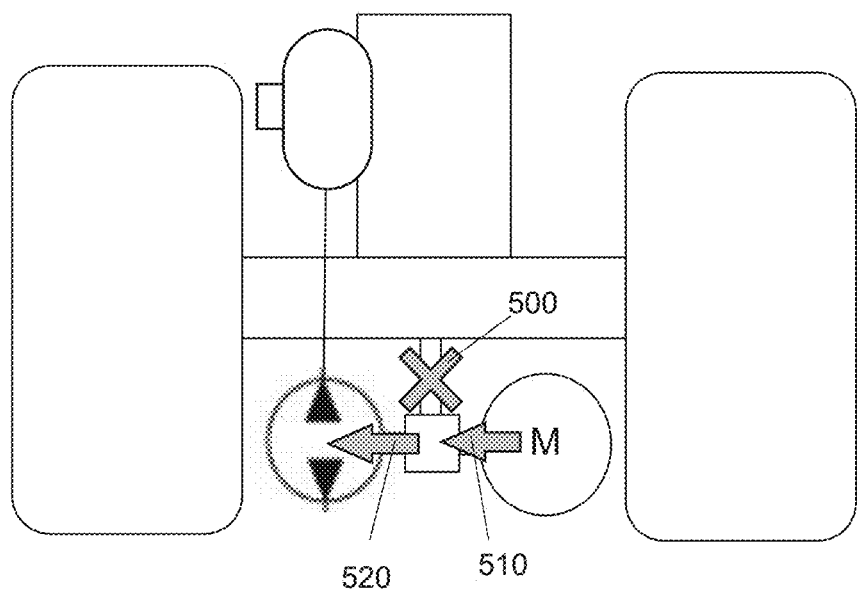
FIG. 4 shows a schematic view of the aircraft landing gear of FIG. 1 in a replenishing mode of operation.

FIG. 4 shows the power system 200 operating in the third replenishing mode of operation. In the replenishing mode of operation, the wheels 120, 130 are mechanically disconnected (represented by cross 500) from the electric motor 230 and the hydraulic pump 212 by the transfer box 220, but the electric motor 230 and the hydraulic pump 212 are connected. The electric motor 230 converts electrical energy into kinetic energy (in the form of rotation of the rotor) which is transferred (represented by arrow 510) to the transfer box 220. The transfer box 220 transfers (represented by arrow 520) that kinetic energy on to the hydraulic pump 212, where it is used to operate the hydraulic pump 212 to pump hydraulic fluid.

The electric motor 230 can drive the hydraulic pump 212 to pump hydraulic fluid into the hydraulic fluid reservoir 210, thereby "replenishing" the store of hydraulic fluid. The electric motor is also operable to drive the hydraulic pump 212 to pump hydraulic fluid out of the hydraulic fluid reservoir 210 (for example, in order to operate one or more further driveable components connected to the hydraulic pump 212). Thus, in the replenishing mode, the electric motor 230 can be said to be operable to control one or more further driveable components hydraulically connected to the hydraulic pump 212.

Figure 5:
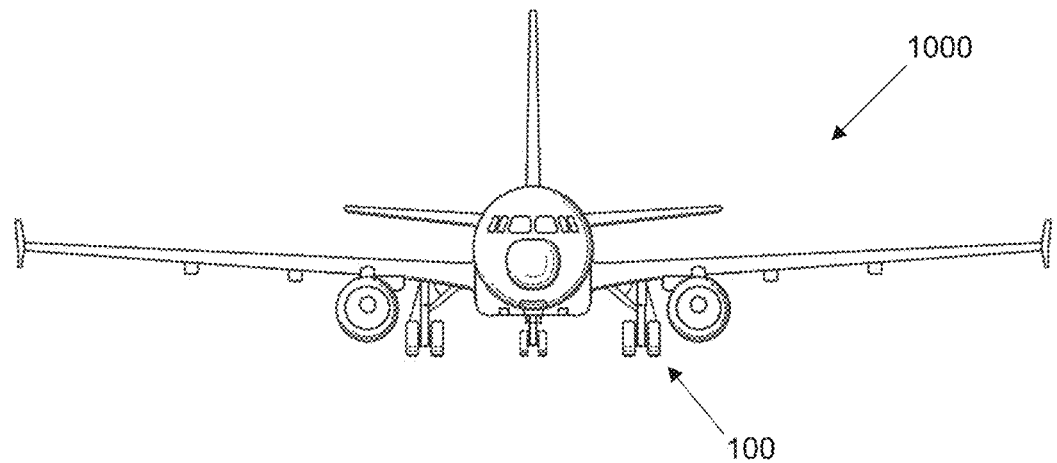
FIG. 5 shows a schematic view of an aircraft having the landing gear of FIG. 1.

FIG. 5 shows an aircraft 1000 comprising the landing gear 100.

The operation of the landing gear 100 and the hybrid power system 200 is now described. Whilst the aircraft is on the ground before take-off, the power system operates in a first driveable mode of operation, driving the wheels 120, 130 using both the electric motor 230 and the hydraulic pump 212 to enable the aircraft to taxi. The aircraft may also drive the wheels 120, 130 using only one of the electric motor 230 and the hydraulic pump 212 (for example, once the aircraft is in motion across the ground and only drive power sufficient to maintain the motion is required). Once the aircraft is in the air, the power system 200 may operate in the replenishing mode of operation, wherein the electric motor 230 drives the hydraulic pump 212 to pump hydraulic fluid into the hydraulic fluid reservoir 210. Optionally, the power system 200 may also operate the hydraulic pump 212 to provide hydraulic power to one or more other driveable components of the aircraft 1000 (for example, by controlling the electric motor 230 to drive the hydraulic pump 212 to provide hydraulic power to the other driveable components). When the aircraft lands (or when braking during taxiing), the power system may operate in the regenerating mode of operation, wherein the wheels 120, 130 are used to drive at least one (for example, both) of the electric motor 230 and the hydraulic pump 212 to recover and store kinetic energy (as electrical and hydraulic energy, respectively). This stored energy can then be used in subsequent operation (for example, in the driving mode or to operate the one or more further driveable components). By using the stored energy to drive the wheels 120, 130, the hybrid power system 200 can recover energy during braking and subsequently use the recovered energy to accelerate again. Such operation can enable more efficient taxiing (for example, where the aircraft is taxiing in a queue, so is repeatedly braking and accelerating).

Figure 6A:
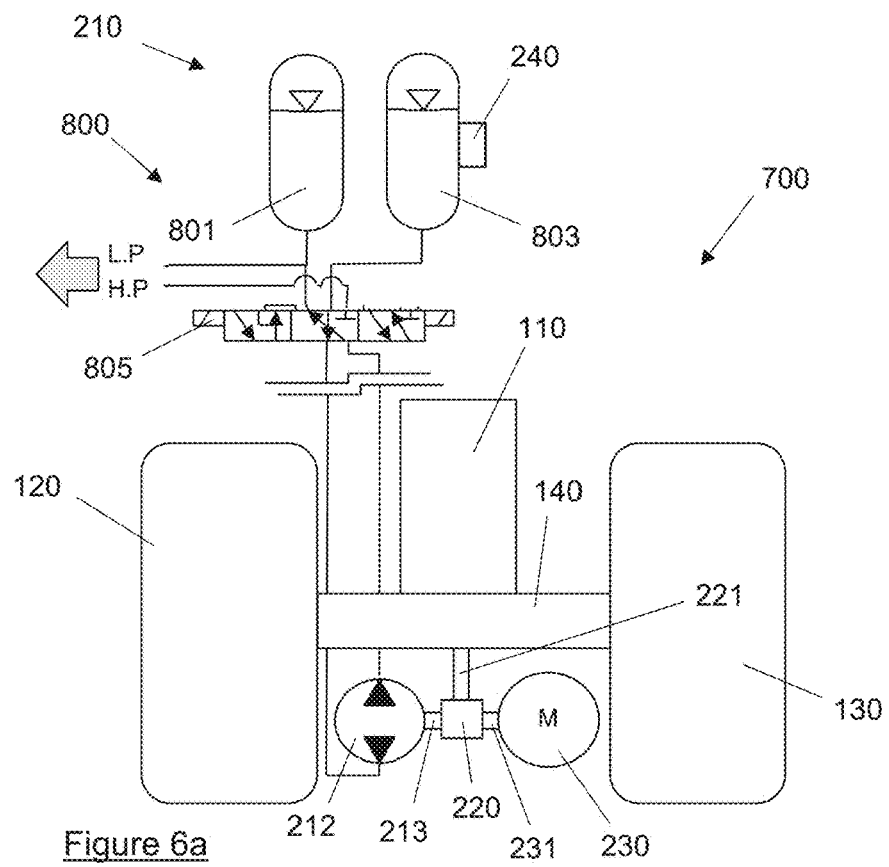
FIGS. 6a-6d show a schematic view of an aircraft landing gear according to a second example embodiment of the invention.

FIG. 6a shows a schematic view of an aircraft landing gear 700 having a hybrid power system 800 according to a second example embodiment of the invention. The same reference numerals as in respect of the first embodiment have been used to label corresponding elements of landing gear 700 and hybrid power system 800. The landing gear 700 and hybrid power system 800 of the second embodiment are the same as those of the first embodiment but for the following differences.

Figure 6B:
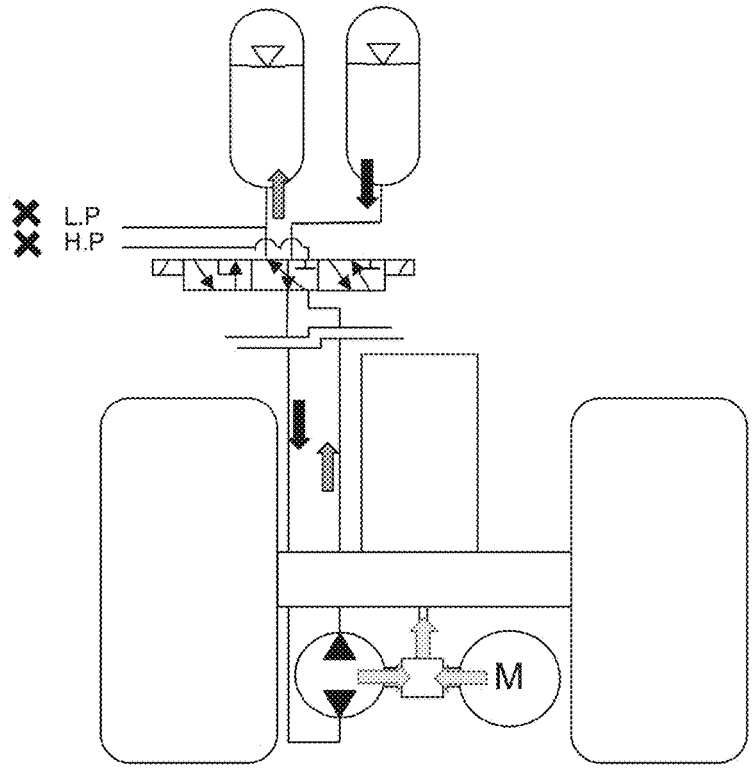
Figure 6C:
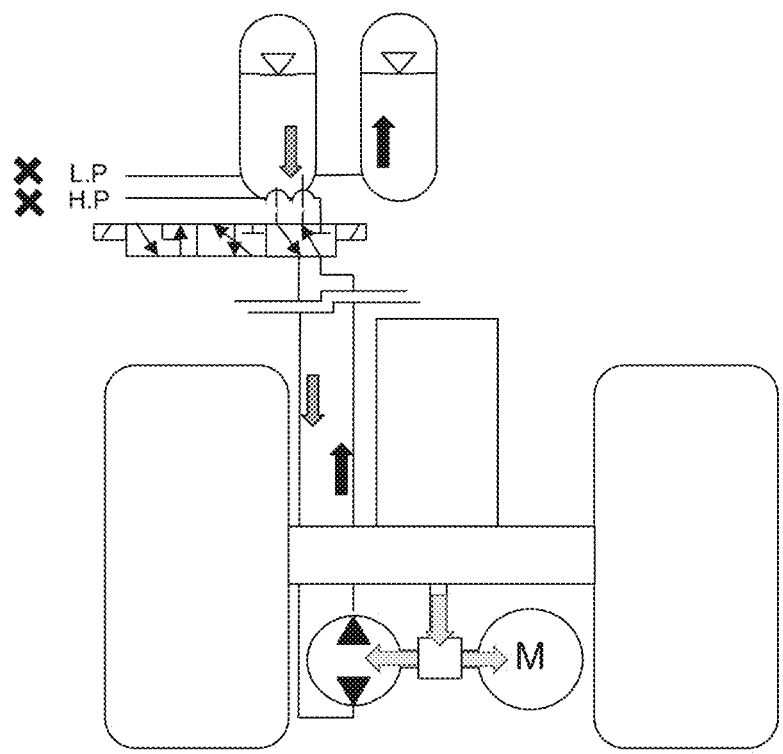
Figure 6D:
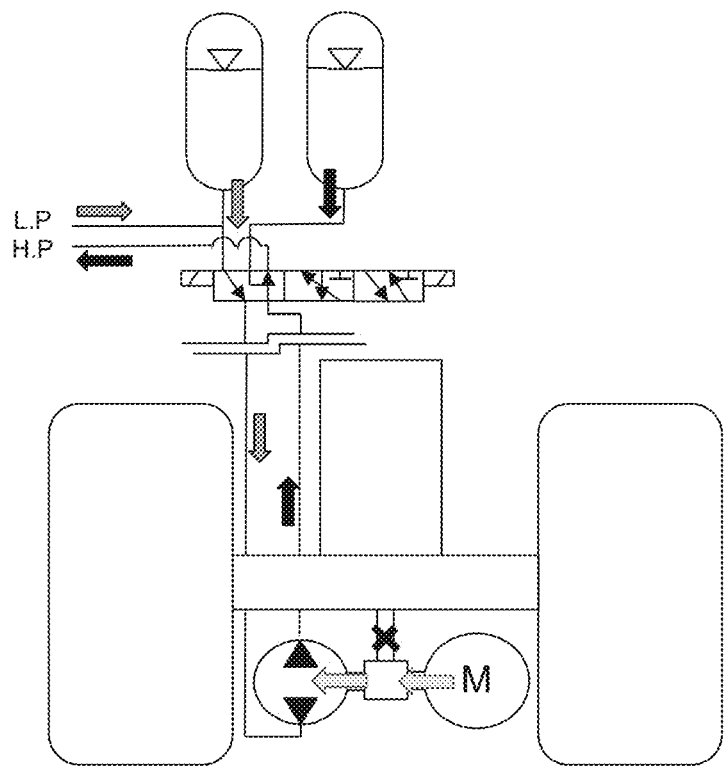

In this example embodiment, the hydraulic fluid reservoir 210 is shown as comprising a hydraulic fluid reservoir 801 separate from a hydraulic accumulator 803. Hydraulic sensor 240 is configured to monitor a state of charge of the hydraulic accumulator 803. Operation of the hybrid power system 800 in the first driveable, regenerating, and replenishing modes of operation is controlled by use of a three-position switch 805. A first position of the switch 805 (shown in FIG. 6b) causes the hybrid power system 800 to operate in the first driveable mode of operation. A second position of the switch 805 (shown in FIG. 6c) causes the hybrid power system 800 to operate in the regenerating mode of operation. A third position of the switch 805 (shown in FIG. 6d) causes the hybrid power system 800 to operate in the replenishing mode of operation. In FIGS. 6b to 6d, the flow of high pressure (H.P) hydraulic fluid is shown with the use of solid black arrows, and the flow of lower pressure (L.P) hydraulic fluid is shown with the use of solid grey arrows.

Figure 7:
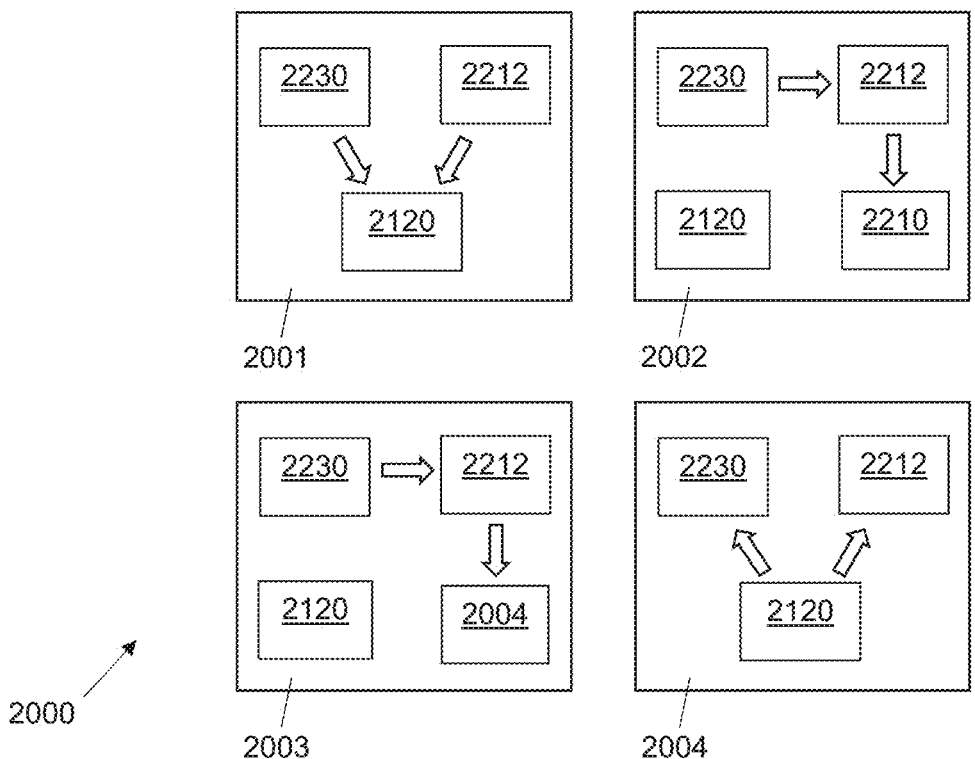
FIG. 7 is a diagram showing a method utilising the first embodiment of the invention.

FIG. 7 is a diagram 2000 illustrating schematically a method of operating the aircraft of FIG. 5. Thus, FIG. 7 shows a first driveable mode of operation 2001 in which the landing gear wheels 2120 are driven by both the electric motor 2230 and the hydraulic pump 2212. FIG. 7 also shows a replenishing mode of operation 2002 in which the electric motor 2230 drives the hydraulic pump 2212 to pump hydraulic fluid into the hydraulic fluid reservoir 2210. FIG. 7 also shows a second driveable mode of operation 2003, in which the electric motor 2230 drives the hydraulic pump 2212 so that it provides hydraulic power to one or more other driveable components 2004. FIG. 7 also shows a regenerating mode of operation 2004 in which the landing gear wheels 2120 are externally driven to drive the electric motor 2230 and/or the hydraulic pump 2212.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Whilst, in the embodiments described above, the first driveable component comprises the wheels of the aircraft, in other embodiments of the invention the first driveable component comprises another part of the aircraft. For example, the first driveable component could be an open rotor propeller. In such a case, it may be that the aircraft is a passenger aircraft. The aircraft may have a capacity of less than 200 passengers, preferably less than 150 passengers, more preferably less than 120 passengers, yet more preferably less than 100 passengers. It may be that the aircraft has a range of less than 2000 nautical miles, preferably less than 1500 nautical miles, more preferably less than 1200 nautical miles, yet more preferably less than 1000 nautical miles. It will also be appreciated by the skilled person that the present invention could be applied to any actuated aircraft part from which recovery of kinetic energy is possible.

In other embodiments of the invention, the power system 200 may further comprise a second electric motor. The second electric motor may be connectable to the hydraulic pump 212. This enables the simultaneous replenishment of the hydraulic fluid reservoir 210 whilst taxiing using the first electric motor 230. The second electric motor may be powered from an aircraft APU, a hydrogen fuel cell, a battery, or the aircraft engines.

It will also be appreciated that, in some embodiments of the invention, the power system 200 may also comprise an unpressurised (or low-pressure) hydraulic fluid tank, which provides (i) a source of hydraulic fluid to pump into the hydraulic fluid reservoir 210 and (ii) a destination for hydraulic fluid released from the hydraulic fluid reservoir 210 in order to drive a driveable component of the aircraft.

Whilst in the described embodiments the power system is configured to prioritise hydraulic energy recovery when operating in the regenerating mode of operation, it will be appreciated by the skilled person that, in other embodiments, the power system may not be configured to prioritise either of hydraulic energy recovery or electrical energy recovery over the other. In other embodiments, the power system may be configured to prioritise electrical energy recovery over hydraulic energy recovery. Similarly, although in the described embodiments the power system is configured to prioritise hydraulic energy recovery by performing only hydraulic energy recovery until the hydraulic fluid reservoir reaches a predetermined state of charge, in other embodiments the hydraulic (or electrical) energy recovery may be prioritised by use of a torque splitting arrangement. It will be appreciated by the skilled person that many other schemes for managing the prioritisation of energy recovery are also possible (including, for example, schemes in which a torque splitting ratio is varied according to a determined state of charge of one or both of the hydraulic fluid reservoir and the battery).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. An aircraft power system, comprising:
   i) a hydraulic reservoir,
   ii) a bi-directional hydraulic pump for pumping hydraulic fluid to and from the hydraulic reservoir, and
   iii) an electric motor,
   wherein the electric motor is connectable to a first driveable component of aircraft such that the electric motor is arranged to drive the first driveable component of the aircraft, and
   wherein the bi-directional hydraulic pump is connectable to the first driveable component of the aircraft such that the bi-directional hydraulic pump is arranged to drive the first driveable component, such that, in a first driveable mode of operation, the first driveable component is driven by both the electric motor and the bi-directional hydraulic pump,
   wherein the electric motor and bi-directional hydraulic pump are connected in parallel such that, in the first driveable mode of operation, both are arranged to supply power to the driveable component independently of the other, and
   wherein the electric motor is connectable to the bi-directional hydraulic pump such that, during a replenishing mode of operation, the electric motor is arranged to drive the bi-directional hydraulic pump to pump hydraulic fluid into the hydraulic reservoir.

2. The aircraft power system of claim 1, wherein the electric motor and bi-directional hydraulic pump are connected to a transfer unit and wherein the transfer unit is connectable to the driveable component.

3. The aircraft power system of claim 1, wherein the electric motor also functions as a generator such that, in a regenerating mode of operation, the electric motor is externally driven by a moveable component of the aircraft to generate electricity.

4. The aircraft power system of claim 1, wherein the bi-directional hydraulic pump is also connectable to other driveable components of the aircraft.

5. The aircraft power system of claim 1, wherein the electric motor is connectable to the bi-directional hydraulic pump such that the electric motor is arranged to drive the bi-directional hydraulic pump to pump hydraulic fluid out of the hydraulic reservoir.

6. The aircraft power system of claim 1, wherein the first driveable component comprises one or more landing gear wheels.

7. The aircraft power system of claim 1, wherein:
   the electric motor also functions as a generator such that, in a regenerating mode of operation, the electric motor is externally driven by the first driveable component to generate electricity;
   the bi-directional hydraulic pump is arranged such that, in the regenerating mode of operation, the bi-directional hydraulic pump is externally driven by the first driveable component to pump hydraulic fluid into the hydraulic reservoir.

8. An aircraft landing gear drive system comprising the aircraft power system of claim 1, wherein the first driveable component comprises one or more landing gear wheels of the landing gear drive system, and wherein the electric motor and the bi-directional hydraulic pump are both connected to the one or more landing gear wheels, such that the electric motor and the bi-directional hydraulic pump are both able to drive the one or more landing gear wheels.

9. An aircraft having a power system, the power system comprising:
   i) a hydraulic reservoir,
   ii) a bi-directional hydraulic pump arranged to drive a first driveable component of the aircraft and for pumping hydraulic fluid to and from the hydraulic reservoir,
   iii) an electric motor arranged to drive the first driveable component of the aircraft,
   the power system being arranged such that in a first driveable mode of operation, the electric motor and bi-directional hydraulic pump are connected in parallel such that both supply power to and drive the driveable component independently of the other, and
   during a replenishing mode of operation, the electric motor is arranged to drive the bi-directional hydraulic pump to pump hydraulic fluid into the hydraulic reservoir.

10. A method of operating the aircraft of claim 9, wherein, in a first driveable mode of operation, the first driveable component is driven by both the electric motor and the bi-directional hydraulic pump.

11. The method of claim 10, wherein in a replenishing mode of operation, the electric motor drives the hydraulic pump to pump hydraulic fluid into the hydraulic reservoir.

12. The method of claim 10, wherein in a second driveable mode of operation, the bi-directional hydraulic pump provides hydraulic power to one or more other driveable components.

13. The method of claim 12, wherein, in the second driveable mode of operation, the electric motor drives the bi-directional hydraulic pump to provide hydraulic power to the other driveable components.

14. The method of claim 9, wherein, in a first driveable mode of operation, one only of the electric motor and hydraulic pump provides power to and drives the driveable component, as a result of a failure in the capability of the other of the electric motor and hydraulic pump to provide such power.

15. The aircraft power system of claim 1, wherein the connection of the electric motor and hydraulic pump in parallel is such that if one of the electric motor and hydraulic pump should fail when operating in the first driveable mode of operation, power is still provided to the driveable component by the other of the electric motor and hydraulic pump.

16. An aircraft power system, comprising:
   i) a hydraulic reservoir,
   ii) a bi-directional hydraulic pump for pumping hydraulic fluid to and from the hydraulic reservoir, and
   iii) an electric motor,
   wherein the electric motor is connectable to a first driveable component of an aircraft such that the electric motor is arranged to drive the first driveable component of the aircraft,
   wherein the bi-directional hydraulic pump is connectable to the first driveable component of the aircraft such that the bi-directional hydraulic pump is arranged to drive the first driveable component, such that, in a first driveable mode of operation, the first driveable component is driven by both the electric motor and the bi-directional hydraulic pump, and in a regenerating mode of operation each of the electric motor and the hydraulic pump are connectable to a moveable component of the aircraft such that each of the electric motor and the hydraulic pump can function as a generator to recover kinetic energy from the moveable component, as a result of being driven by the moveable component, and wherein in the regenerating mode, the operation comprises prioritizing energy recovery by the hydraulic pump over energy recovery by the electric motor.

17. The aircraft power system of claim 16, wherein in the regenerating mode of operation the electric motor is externally driven using the kinetic energy from the moveable component of the aircraft to generate electricity, and the hydraulic pump is driven using the kinetic energy from the moveable component to pump hydraulic fluid into the hydraulic fluid reservoir.

18. The aircraft power system of claim 16, wherein the electric motor and bi-directional hydraulic pump are connectable in parallel to the driveable component such that, in the first driveable mode of operation, both are arranged to supply power to the driveable component independently of the other.

19. The aircraft power system of claim 16, wherein the electric motor is connectable to the bi-directional hydraulic pump such that, during a replenishing mode of operation, the electric motor is arranged to drive the bi-directional hydraulic pump to pump hydraulic fluid into the hydraulic reservoir.

20. An aircraft having a power system, the power system comprising:

i) a hydraulic reservoir, ii) a bi-directional hydraulic pump arranged to drive a first driveable component of the aircraft and for pumping hydraulic fluid to and from the hydraulic reservoir, and iii) an electric motor arranged to drive the first driveable component of the aircraft, the power system being arranged such that in a first driveable mode of operation, the first driveable component is driven by both the electric motor and the bi-directional hydraulic pump, and in a regenerating mode of operation each of the electric motor and the hydraulic pump are connectable to a moveable component of the aircraft such that each of the electric motor and the hydraulic pump can function as a generator to recover kinetic energy from the moveable component, as a result of being driven by the moveable component, and wherein in the regenerating mode, the operation comprises prioritizing energy recovery by the hydraulic pump over energy recovery by the electric motor.

\* \* \* \* \*